UNITED STATES PATENT OFFICE.

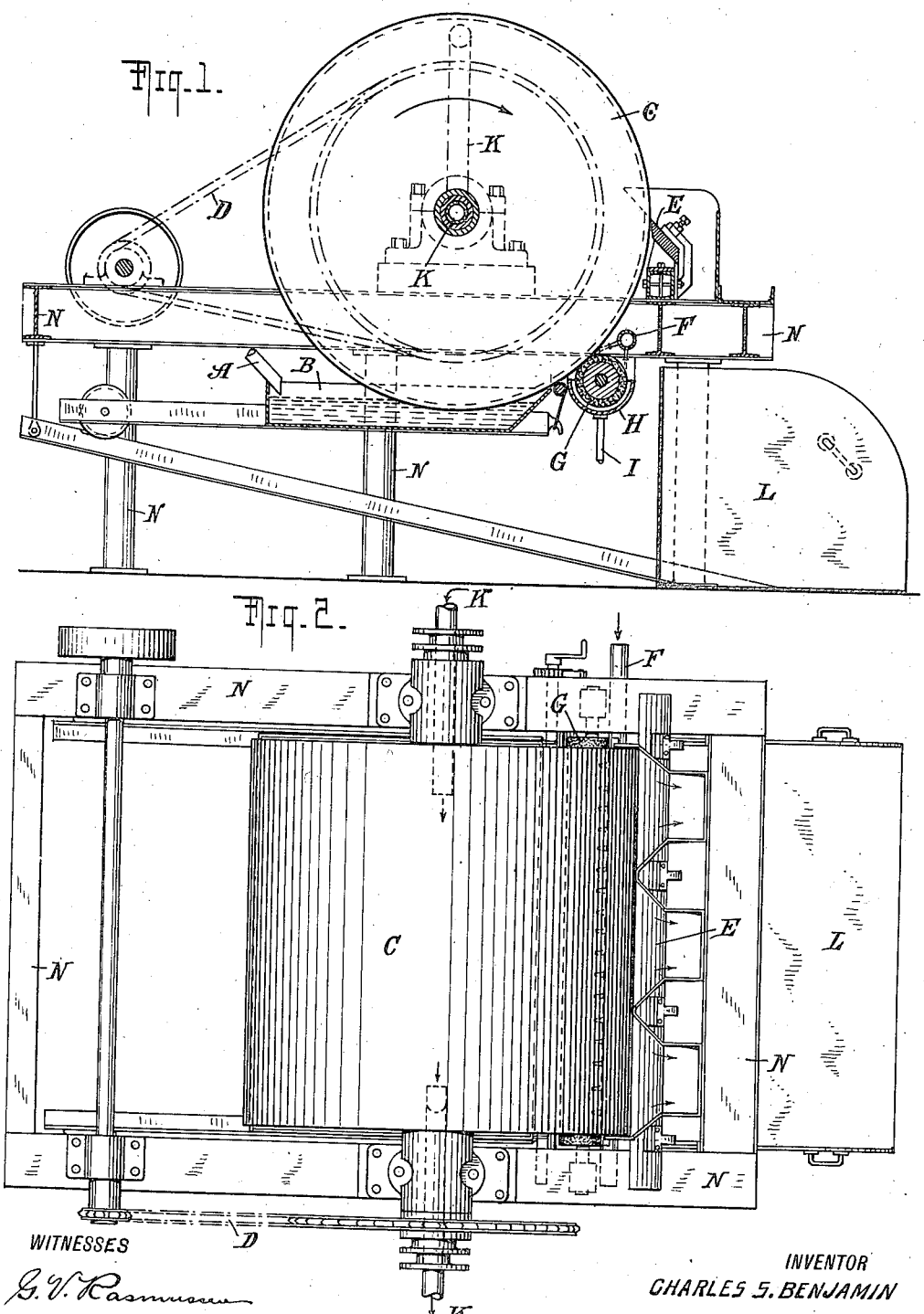

CHARLES S. BENJAMIN, OF EAST ORANGE, NEW JERSEY, ASSIGNOR TO GENERAL CHEMICAL COMPANY, OF NEW YORK, N. Y., A CORPORATION OF NEW YORK.

CHIPPED NITER CAKE AND PROCESS OF MAKING SAME.

1,312,430.  Specification of Letters Patent.  Patented Aug. 5, 1919.

Application filed April 22, 1919. Serial No. 291,941.

*To all whom it may concern:*

Be it known that I, CHARLES S. BENJAMIN, a citizen of the United States, and resident of East Orange, county of Essex, and State of New Jersey, have invented certain new and useful Improvements in Chipped Niter-Cakes and Processes of Making Same, of which the following is a specification.

This invention relates to the manufacture of niter cake in a new form which imparts to the product valuable commercial characteristics and makes the niter cake available for uses for which it was heretofore not adapted.

The particular object of the invention is to convert molten niter cake into a condition where it will consist of substantially uniform thin flakes resistant against decomposition, which can be used without further preparation in a variety of commercial operations, or easily put into solution with water and which can be easily handled mechanically and very readily converted into powder.

Niter cake, for the purposes of this specification, may be considered as being composed of an acid sodium sulfate resulting from the manufacture of nitric acid from sodium nitrate and sulfuric acid. Niter cake may be used in a variety of commercial operations for the production of other and valuable materials. Speaking generally, the physical condition of niter cake, as known to the market, is that of solid irregular lumps or pieces of broken niter cake. The molten niter cake, as it comes from the stills or other reaction vessels, is generally run into flat trays of, for example, 6 feet by 12 feet with a depth of from 3 to 6 inches. The liquid mass in these trays ordinarily requires about twelve hours to cool and to set, whereupon the solid slab is broken up by the use of crowbars, sledges or chisels. The irregular lumps thus obtained are of a size workable in a disintegrator or other grinding machine in which they could then be reduced to a certain degree of fineness.

Many of the commercial operations for which chemically niter cake is suited require, however, a fine state of subdivision which is beyond that which can be obtained in any efficient practical manner. At best all attempts to produce the required degree of fineness have heretofore been a laborious and time-consuming and not always a satisfactory operation. In fact by some (see Th. Meyer "*Die Fabrication von sulfat und Salzsæure,*" 1907, p. 79) the problem of conveniently grinding niter cake to suitable fineness was regarded as an unsolvable problem and only the use of a four-drum disintegrator was considered a commercial possibility with respect to the problem. (Meyer, p. 62). One substantial difficulty inherent in powdered niter cake is its great affinity for water, a quality which makes it practically impossible to store the pulverulent niter cake or to ship it since it has among others, a tendency to become reconverted into lumps. On the other hand, to ship in lumps required the user to operate his own grinding plant which is not commercially feasible, especially as, for the reasons already explained, the reduction of the niter cake lumps to the form of powder in itself presented problems which have not been satisfactorily solved.

According to the process devised by me, a solution of the various problems is found in the conversion of the molten niter cake directly into the form of small chips or flakes according to the special manner hereinafter described, for which purpose an apparatus such as is shown in the accompanying drawings was devised by me and may be conveniently employed.

In the drawings Figure 1 is a vertical section taken just inside of the frame and Fig. 2 is a top plan view of machinery suitable for the purposes of producing a chipped niter cake. In this drawing the frame of the machine is indicated as N. A indicates a spout or trough for delivering molten niter cake to the pan B. The drum C, the movement of which is controlled by the driving wheel D, is at its lowermost point in contact with the molten liquid in the pan B. The drum C is hollow and is axially supplied with cooling means, such as water, as indicated at K. A knife E is so located with respect to the drum C as to strip the niter cake therefrom after the drum C has made more than a half revolution. The device, as thus far described, although apparently constituting a feasible method of producing chipped of flaked niter cake, is not capable of producing a satisfactory result and experiments have satisfied me that efforts to produce chipped or flaked niter cake product by the use of only the elements heretofore described will, if continued, result in failure for the reason that the solidified niter cake adheres so tenaciously to the periphery of the drum that its removal therefrom by the knife E is only partial so that only a small part of the product comes off in flaky form while the balance still adhering to the drum picks up further niter cake from the pan B. In other words, not only are mechanical difficulties encountered but the method described is wholly unsuited to any commercial application, continuous or otherwise. I have found, however, that if in spite of and in contradiction to the apparent necessity of avoiding introducing moisture to the cooling niter cake I cause a layer of moisture to be formed upon the surface of the drum C just prior to the time that the drum comes in contact with the molten niter cake in the pan B, an extraordinarily and unexpectedly satisfactory result will be obtained. Apparently such a uniform or practically uniform film or thin layer of water does not injuriously affect the cooling niter cake but serves to prevent tenacious adherence of the layer of niter cake upon the peripheral surface of the drum C to such an extent that when the niter cake is solidified it will almost of itself become detached from the drum C, so that the knife E acts less as a cutting tool but rather as an instrument for causing the flakes to crumble and to guide the crumbled flakes away from the drum. In this case the solidified and adhering niter cake is very readily removed from the drum C, in its practical entirety, in a flaked or chipped condition and at such a rate and in such a manner that there is no substantial lapse of time between the inflow of the molten niter cake and the outgo of flaked or chipped solidified niter cake in a physical condition to be readily moved by conveyers and to be used in that condition for some commercial chemical operations or, if need be, for ready reduction to a fine powder in an ordinary ball-mill. The chipped product may also be barreled or stored or shipped and that without substantial caking together for quite a long period of time, such, for example, as two months. It will be apparent that the chips of niter cake thus produced are thin laminæ whose two larger surfaces are in a condition which I may describe as relatively smooth, by which I means a condition such as is brought about by the hardening of the layer of niter cake on the drum C followed by the almost automatic separation or detachment from said drum. The edges of each flake constitute broken surfaces and constitute a very small proportion of the surface of each chip. The major surfaces of each chip are, as stated, smooth. These characteristics of the chips apparently impart to them the property of resistance against substantial caking together for quite a period of time.

In order to apply the practically uniform film or thin layer of water to the surface of the drum C a variety of instrumentalities may be employed. I have found a number of such devices to be useful. The particular form shown in the drawings consists of a roll G provided with a felted surface. Back of this roll is a perforated pipe F which supplies water to the roll G. H is a trough to receive surplus water and I the drain pipe. The roll G imparts to the surface of the drum C a practically continuous uniform layer of moisture which, as described, produces the satisfactory result hereinabove recited. In place of the roll G and perforated pipe F, wetted felt, wetted rubber rollers, a plurality of tiny water-sprays or of water-atomizers may also be used. In so far as the results accomplished by the use of one or the other of such more or less equivalent means are concerned, they differ somewhat with respect to the continuity of production of the chipped niter cake, a circumstance which I ascribe to differences in the continuity of the film or thin layer of water on the face of the drum. The result obtained from the use of proper moistening of the drum surface is most satisfactory. For example, I have been able to produce continuously as much as 160 lbs. per hour of chipped niter cake per square foot of drum surface on a drum having 29 square feet of surface. In other words, 2¼ tons of chipped niter cake per hour, with a speed of six revolutions per minute. Increasing the revolutions per minute will not only increase the hourly output but will also make a thinner product. It is apparent that with this process a given amount of niter cake may be solidified in far less time and in much less space than by any known process. A very much less efficient result and one not to be recommended for continuous commercial use is obtained by mixing water with the molten niter cake and allowing the water vapors arising therefrom to impinge upon the surface of drum C just immediately prior to the time that it contacts with the molten niter cake. The procedure does not, however, enable the production of chipped niter cake to be carried on continuously and its operation is erratic and spasmodic and subject to frequent stoppages and great irregularities. This is true whether the molten niter cake contained 3½ or 7% of water.

It is not impossible, however, to use the surface of molten niter cake itself for the suitable evaporation of water so that those vapors in impinging upon the drum just prior to contact with the molten niter cake may so moisten the drum surface as to give good results temporarily or even for a rather long period of time and such a mode is clearly within my invention. I, therefore, prefer the process which involves a direct application of water as a thin film to the surface of the drum. An important factor in making for best results is that the moist surface of the drum C should, as near as may be, be a continuous, nearly uniform thin film and layer of water. The more uniform and continuous this film and layer is just prior to the entry of the drum surface into the molten niter cake, the more readily, continuously and completely the production of chipped niter cake takes place.

In place of the foregoing application of water I can, by suitably applying water vapor or steam, obtain commercially efficient results. I have also found that in place of water machine oil, oleic acid or paraffin may be used but the result is not quite as good. Water solutions of salts such as soda ash, common salt and the like may also be used instead of water and these various substances, as well as equivalents thereof, are intended to be included by me where in the claims I have used the expression "moistened," by which I mean the introduction of a cushioning or spacing element to minimize the tenacity of adhesion between the inner surface of the niter cake and the outer surface of the drum.

The speed of the drum C should be suitably regulated for the purpose of securing the most beneficial results. The process as described causes the film of niter cake to have only the weakest kind of adherence to the drum surface when the layer is cooled. Consequently, if the niter cake is completely hardened before the drum surface adjacent to which it rests has passed the uppermost portion of the cycle of revolution, the niter cake is likely to become detached from the drum C and fall back into the pan B. The rotation of drum C must, therefore, be accelerated so that the tendency of the hardened niter cake to detach itself automatically from the drum surface shall not begin until after a half revolution of the drum has taken place. In other words, the speed of the movement is such that the layer of niter cake upon the drum surface has not completely set until after said layer has passed the uppermost point of the rotary motion. The knife or stripper E is located between said point and the point where the moisture is applied to the surface of the drum. As the flakes of chipped niter cake are stripped from the drum by the knife E they fall into the receptacle L, which is provided for their reception. The chips, as thus produced, are in the form of laminæ whose dimensions, although they vary quite considerably and no two are alike, may generally be illustrated by reference to a chip approximately ¾ of an inch long, half an inch wide and $\frac{1}{16}$ of an inch thick.

Having thus described my invention, what I claim is:

1. The process of treating a molten salt which consists in transferring a relatively thin layer thereof upon a moistened, relatively cool surface, retaining said layer upon said surface until the salt is solidified and upon hardening of the said layer upon said surface removing the solidified salt therefrom in the form of chips or flakes.

2. The process of treating niter cake which consists in transferring a relatively thin layer thereof upon a moistened, relatively cool surface and upon hardening of the layer of niter cake upon said surface removing it therefrom in the form of chips or flakes.

3. The process of treating niter cake which consists in transferring a relatively thin layer thereof upon a moistened, relatively cool surface having a rotary direction of movement and upon hardening of the layer of niter cake upon said surface removing it therefrom in the form of chips or flakes.

4. The process of treating niter cake which consists in transferring a relatively thin layer thereof upon a moistened, relatively cool surface having a rotary direction of movement, the speed of said movement being such that the layer of niter cake upon said surface is not completely set until after the layer has passed the uppermost point of the rotary motion and upon hardening of the layer of niter cake upon said surface removing it therefrom in the form of chips or flakes.

5. The process of treating niter cake which consists in transferring a relatively thin layer thereof upon a moistened, relatively cool surface having a rotary direction of movement, the speed of said movement being such that the layer of niter cake upon said surface is not completely set until after the layer has passed the uppermost point of the rotary motion and stripping the niter cake from said surface in the form of a chipped or flaked product at that point of said rotary movement which is between the uppermost point described and the further continuance of motion toward the body of molten niter cake.

6. Niter cake in chipped or flaked form, the two larger surfaces of each flake consisting of relatively smooth, unbroken surfaces, one of which exhibits the characteristics of a surface solidified upon a moistened, cooled surface, while the other exhibits those of an air cooled surface.

7. Niter cake in chipped or flaked form which can be obtained by transferring a relatively thin layer of molten niter cake upon a moistened, relatively cool surface, retaining said layer upon said surface until the entire cake is solidified and then simultaneously removing and breaking the solidified layer into flakes.

In testimony whereof I have hereunto set my hand.

CHARLES S. BENJAMIN.